United States Patent
Janhunen

(10) Patent No.: US 10,159,200 B2
(45) Date of Patent: Dec. 25, 2018

(54) STUMP EXTRACTION DEVICE, SYSTEM AND METHOD FOR EXTRACTING STUMPS

(71) Applicant: RAMTEC OY, Lahti (FI)

(72) Inventor: Veikko Janhunen, Hollola (FI)

(73) Assignee: RAMTEC OY, Lahti (FI)

( * ) Notice: Subject to any disclaimer, the term of this patent is extended or adjusted under 35 U.S.C. 154(b) by 85 days.

(21) Appl. No.: 15/346,277

(22) Filed: Nov. 8, 2016

(65) Prior Publication Data
US 2017/0135293 A1    May 18, 2017

(30) Foreign Application Priority Data
Nov. 12, 2015   (FI) ...................................... 20155835

(51) Int. Cl.
*A01G 23/06* (2006.01)

(52) U.S. Cl.
CPC .......... *A01G 23/065* (2013.01); *A01G 23/062* (2013.01)

(58) Field of Classification Search
CPC ..... A01G 23/065; A01G 23/062; A01G 23/06
See application file for complete search history.

(56) References Cited

U.S. PATENT DOCUMENTS

| | | | | |
|---|---|---|---|---|
| 3,116,048 A * | 12/1963 | Irwin | ..................... | A01G 17/16 254/132 |
| 3,333,717 A * | 8/1967 | Scaperotto | .............. | E02F 3/963 294/103.1 |
| 3,353,575 A * | 11/1967 | Larson | ................. | A01G 23/083 144/24.13 |
| 3,487,864 A * | 1/1970 | Larson | ................. | A01G 23/085 144/339 |
| 3,575,222 A * | 4/1971 | Tucek | .................. | A01G 23/089 144/34.1 |
| 3,590,760 A * | 7/1971 | Boyd | ................... | A01G 23/085 144/24.13 |

(Continued)

FOREIGN PATENT DOCUMENTS

| AT | 411675 B | 4/2004 |
|---|---|---|
| EP | 1639887 A1 | 3/2006 |

(Continued)

OTHER PUBLICATIONS

Jan. 20, 2016 Search Report issued in Finnish Patent Application No. 20155835.

(Continued)

*Primary Examiner* — Jamie L McGowan
(74) *Attorney, Agent, or Firm* — Oliff PLC

(57) ABSTRACT

A stump extraction device that includes two opposite jaws, two opposite cutting blades that are extensions of free ends of the jaws, a rotation device, and fixing elements that are configured to rigidly fix the stump extraction device to a desired object. The rotation device is configured to rotate the body and the jaws with respect to the fixing elements. A moving working machine includes the stump extraction device and a knuckle boom assembly, to an end of which the stump extraction device is rigidly connected. The moving working machine may be a crawler excavator. In a method, roots in the ground are cut off from a stump by closing of the jaws, and the stump is separated from the roots by lifting the stump extraction device by means of the knuckle boom assembly.

20 Claims, 5 Drawing Sheets

(56) References Cited

U.S. PATENT DOCUMENTS

| | | | | |
|---|---|---|---|---|
| 3,735,786 A * | 5/1973 | Vit | A01G 23/095 | 144/24.13 |
| 3,894,568 A * | 7/1975 | Windsor | A01G 23/08 | 144/24.13 |
| 3,910,326 A * | 10/1975 | Tucek | A01G 23/081 | 144/34.1 |
| 4,067,369 A * | 1/1978 | Harmon | A01G 23/065 | 144/24.12 |
| 4,088,163 A * | 5/1978 | Levesque | A01G 23/089 | 144/34.5 |
| RE30,153 E * | 11/1979 | Busch | A01G 23/08 | 144/4.1 |
| 4,194,542 A * | 3/1980 | Eriksson | A01G 23/097 | 144/208.8 |
| 4,355,476 A * | 10/1982 | Engkvist | E02F 3/404 | 37/406 |
| 4,440,202 A * | 4/1984 | Everett | A01G 23/095 | 144/24.13 |
| 4,515,192 A * | 5/1985 | Eriksson | B66C 1/585 | 144/24.13 |
| 4,703,968 A * | 11/1987 | LaBounty | B66C 1/64 | 294/106 |
| 5,078,214 A * | 1/1992 | Holley | B66C 3/04 | 111/900 |
| 5,109,900 A * | 5/1992 | Gilbert | A01G 23/081 | 144/24.13 |
| 5,438,772 A * | 8/1995 | Mieger | B23D 17/00 | 37/406 |
| 5,471,747 A * | 12/1995 | Morikawa | B23D 17/00 | 144/34.5 |
| 5,516,174 A * | 5/1996 | Squyres | A01G 23/04 | 294/206 |
| 5,887,635 A * | 3/1999 | Hamby, Jr. | A01G 23/097 | 144/24.13 |
| 5,944,077 A * | 8/1999 | Henning | B27B 29/00 | 144/24.13 |
| 5,975,168 A * | 11/1999 | Ericksson | A01G 23/097 | 144/208.2 |
| 6,076,572 A | 6/2000 | Cook | | |
| 6,343,633 B1 * | 2/2002 | Larsson | A01G 23/087 | 144/339 |
| 6,431,232 B1 * | 8/2002 | Seymour | A01G 23/097 | 144/24.13 |
| 6,488,063 B2 * | 12/2002 | Seymour | A01G 23/095 | 144/24.13 |
| 6,592,316 B2 * | 7/2003 | Hensler | E02D 7/26 | 212/292 |
| 9,139,402 B2 * | 9/2015 | Dodge, IV | B66C 1/445 | |
| 9,267,307 B2 * | 2/2016 | St-Yves | B25J 15/024 | |
| 9,518,405 B2 * | 12/2016 | Hull | A01G 17/16 | |
| 9,781,885 B2 * | 10/2017 | Niekamp | A01G 23/065 | |

FOREIGN PATENT DOCUMENTS

| | | |
|---|---|---|
| FI | 58708 C | 4/1981 |
| FI | 121258 B | 9/2010 |
| SE | 444305 B | 4/1986 |
| WO | 83/00079 A1 | 1/1983 |
| WO | 2010/042037 A1 | 4/2010 |

OTHER PUBLICATIONS

Jan. 20, 2016 Office Action issued in Finnish Patent Application No. 20155835.

* cited by examiner

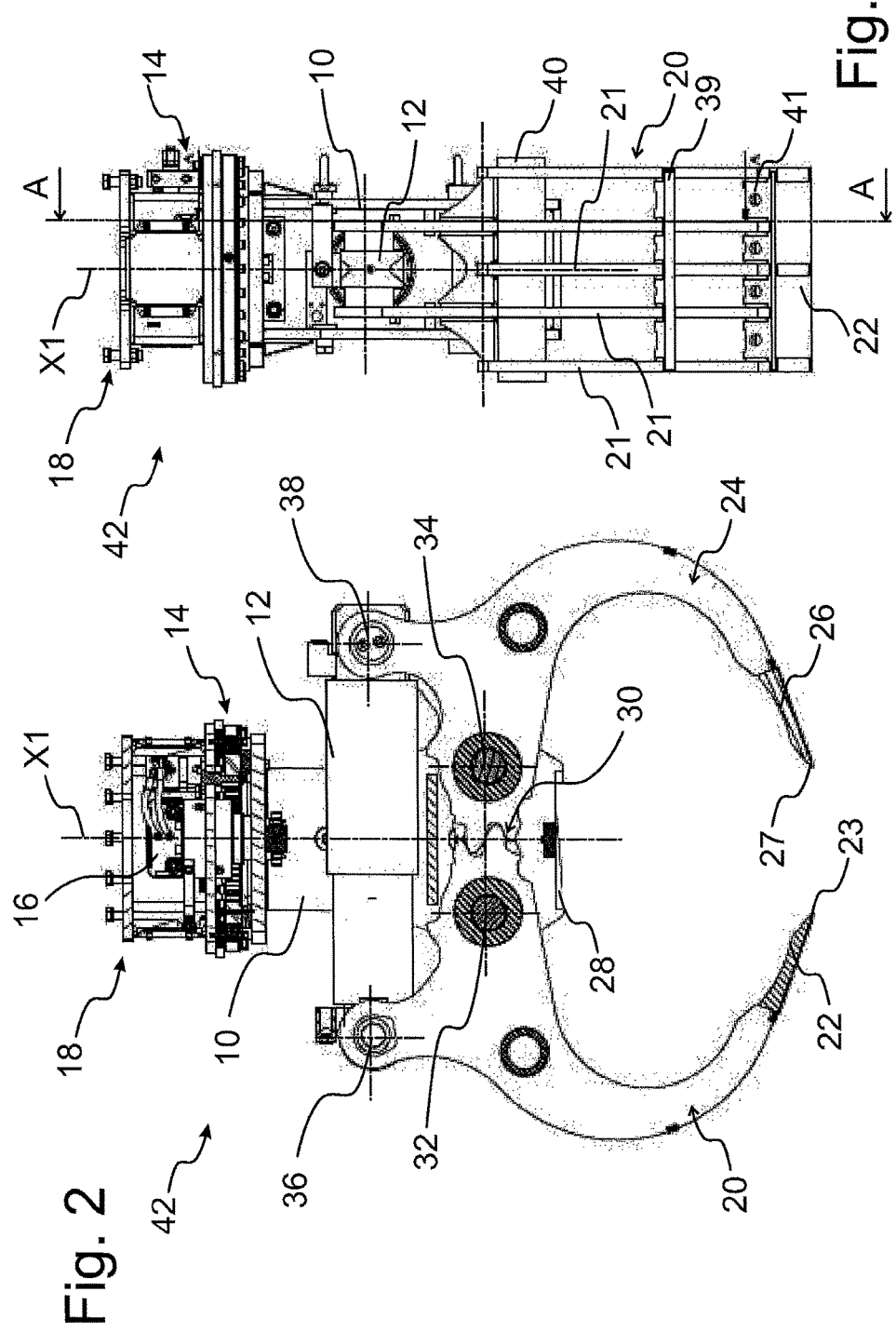

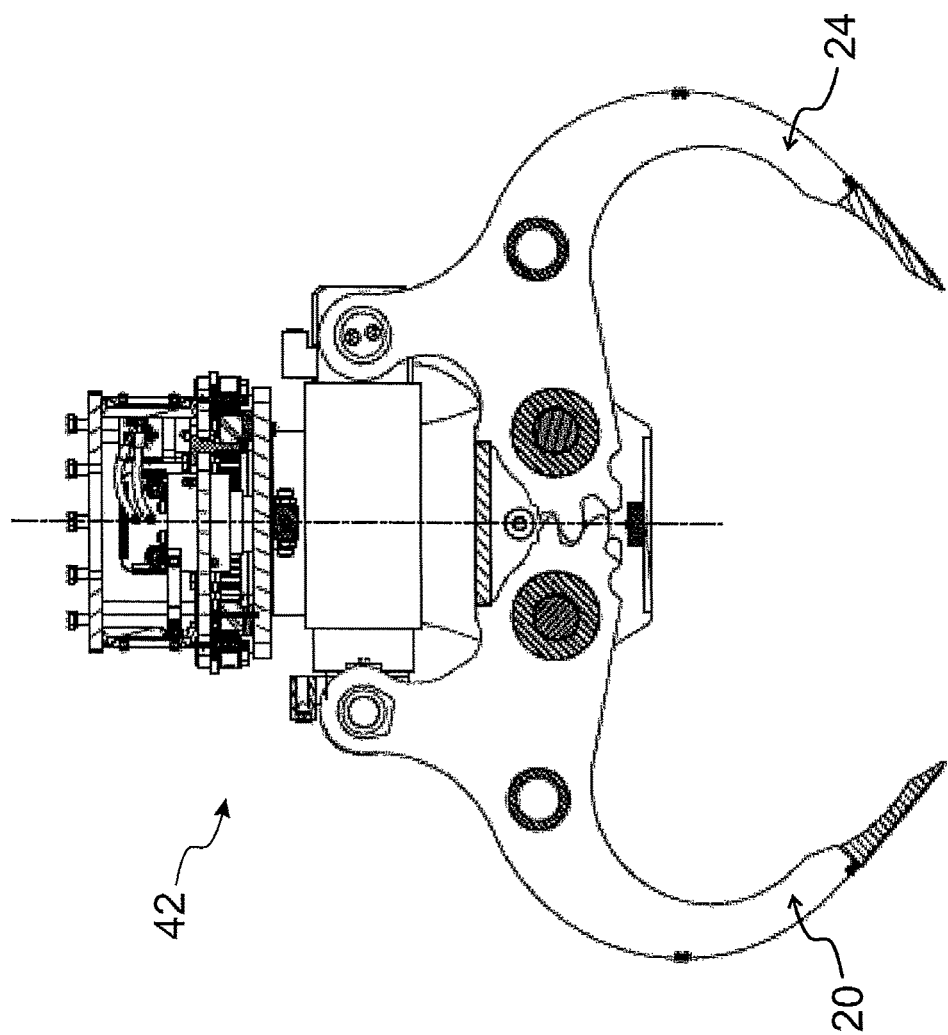

STUMP EXTRACTION DEVICE, SYSTEM AND METHOD FOR EXTRACTING STUMPS

OBJECT OF THE SOLUTION

The solution presented relates to a stump extraction device. The solution presented further relates to a moving working machine incorporating a stump extraction device. The solution presented further relates to a method for extracting stumps, the method utilising the moving working machine and the stump extraction device.

BACKGROUND OF THE SOLUTION

In connection with timber harvesting, the stumps of the cut trees remain in place in the ground. Tree stumps can also be collected and utilised in energy production or power plants.

A stump to be extracted consists of the cut lowest part of a tree trunk and the roots attached to it, which include some thick roots and numerous thin roots. For example, a fir tree's roots may be spread over a large area around the stump, close to the ground, and a pine tree may in addition have a sturdy main root which has grown downwards under the stump.

The stumps are extracted from the ground, possibly also chopped, and stored to dry in high heaps for a few weeks. After this, they can be hauled to large stockpiles in storage areas for further drying. Stumps require a drying time of 1 to 2 years, after which they are transported to a power plant for crushing and burning. The thermal energy produced is used, for example, for district heat production.

Various stump extraction devices are known. Most often they are devices with clamping parts, jaws or cutting blades. Stump extraction devices are usually suspended on or fixed to the end of the knuckle boom assembly of a moving working machine. The working machine may be an excavator with caterpillar drive, the bucket of which is replaced with the stump extraction device. The stump harvester is controlled by means of the working machine's hydraulic system.

Stump extraction clearly damages the soil and, in addition, the stumps carry impurities, such as soil, sand, gravel and even stones which are attempted to be removed from the stumps by different methods. Cleaning is carried out both during stump extraction and in the storage areas. The impurities cause problems when the stumps are crushed and in the power plants.

BRIEF SUMMARY OF THE SOLUTION

The stump extraction device according to the solution presented comprises a body, two opposite jaws connected with articulations to the body, two opposite cutting blades connected as extensions of the jaws, one or more actuators, a rotation device and fixing elements. The fixing elements are fixed to the rotation device and by means of the fixing elements the stump extraction device can be fixed to the desired object, most preferably rigidly. The rotation device is configured to rotate the body, and at the same the jaws, with respect to the fixing elements.

The advantage of the solution presented is that a cut stump without roots can be removed from the ground without the ground being disturbed over the large area to which the roots extend. The roots remain in the ground.

The cut stumps fit more closely during transfers and transportation than stumps with roots and thus the efficiency of transfers and transportation increases and storage is less space-consuming and more efficient.

A further advantage is that a cut stump carries much less impurities such as soil, sand, gravel or stones. The need to clean the stumps diminishes or is completely eliminated.

According to an example of the stump extraction device according to the solution, the stump extraction device further comprises at least one splitting blade positioned inside the jaws.

The advantage provided by the splitting blade are the cracks formed in the cut stump due to which the stump dries faster than a solid, whole stump.

The moving working machine according to the solution comprises a stump extraction device and a knuckle boom assembly, to the end of which the stump extraction device is connected, most preferably rigidly.

When the stump extraction device comprises a rotation device and it is rigidly fixed to the knuckle boom assembly, the position of the stump extraction device can be controlled in a more versatile manner than that of devices which are freely suspended at the end of a knuckle boom assembly and the position of which cannot be inclined or turned, for example, from a vertical position to a horizontal or inclined position. When the fixing is rigid, so to speak, the stump extraction device can be fixed to elements or devices for adjusting the position, the elements or devices being fixed, for example, to the end of the knuckle boom assembly, and by means of which the versatile position control described above is possible.

The advantage is that the stump extraction device can be connected to the knuckle boom assemblies of different working machines, whereby their potential uses become more extensive and versatile.

The advantage of the versatile position control described above is that the stump extraction device can also be applied to other tasks, such as for piling, loading and splitting the stumps, tree trunk cutting and clearing of storm damage.

According to an example of the working machine according to the solution, the working machine is a crawler excavator.

In the method according to the solution for extracting a stump in the ground is utilised a system which comprises a moving working machine and a stump extraction device. The working machine comprises a knuckle boom assembly to the end of which the stump extraction device is connected, most preferably rigidly.

According to an example of the method according to the solution, the method comprises a preliminary stage, at which the cutting blades of the jaws are placed on opposite sides of the stump, when the jaws are in the open position, a cutting stage, at which the roots in the ground are cut off from the stump by means of cutting blades and by bringing the jaws towards the closed position and the underside of the stump, and further, a final stage, at which the stump is separated from the roots by bringing the jaws into the closed position and lifting the stump extraction device.

According to an example of the method according to the solution, the method further comprises at least one position changing stage which is carried out after the cutting stage and in which the jaws are brought towards the open position and lifted from the ground. After this, the stump extraction device is rotated by means of a rotation device essentially around a vertical rotation axis and the above-mentioned preliminary stage and cutting stage are repeated.

According to an example of the method according to the solution, during the cutting stage in the method, the stump extraction device is in addition pressed to the ground by means of the knuckle boom assembly or by supporting the working machine on the ground by means of the knuckle boom assembly and the stump extraction device. The supporting takes place by the working machine inclining and rising partly off the ground.

The advantage is that the penetration of the cutting blades of the jaws into the ground can be intensified by means of the mass of the knuckle boom assembly or the working machine. The rigid fixing of the stump extraction device described above makes it possible for the working machine to be supported on the ground through the stump extraction device.

DESCRIPTION OF THE DRAWINGS

FIG. 1 shows a side view of an example of the stump extraction device according to the solution presented.

FIG. 2 shows the example of FIG. 1 as a front view and as a section at point A-A of FIG. 1.

FIG. 3 shows the example of FIG. 1 as a front view, as a section at point A-A, and with the jaws in a fully open position.

DETAILED DESCRIPTION OF THE SOLUTION

Figure 4:
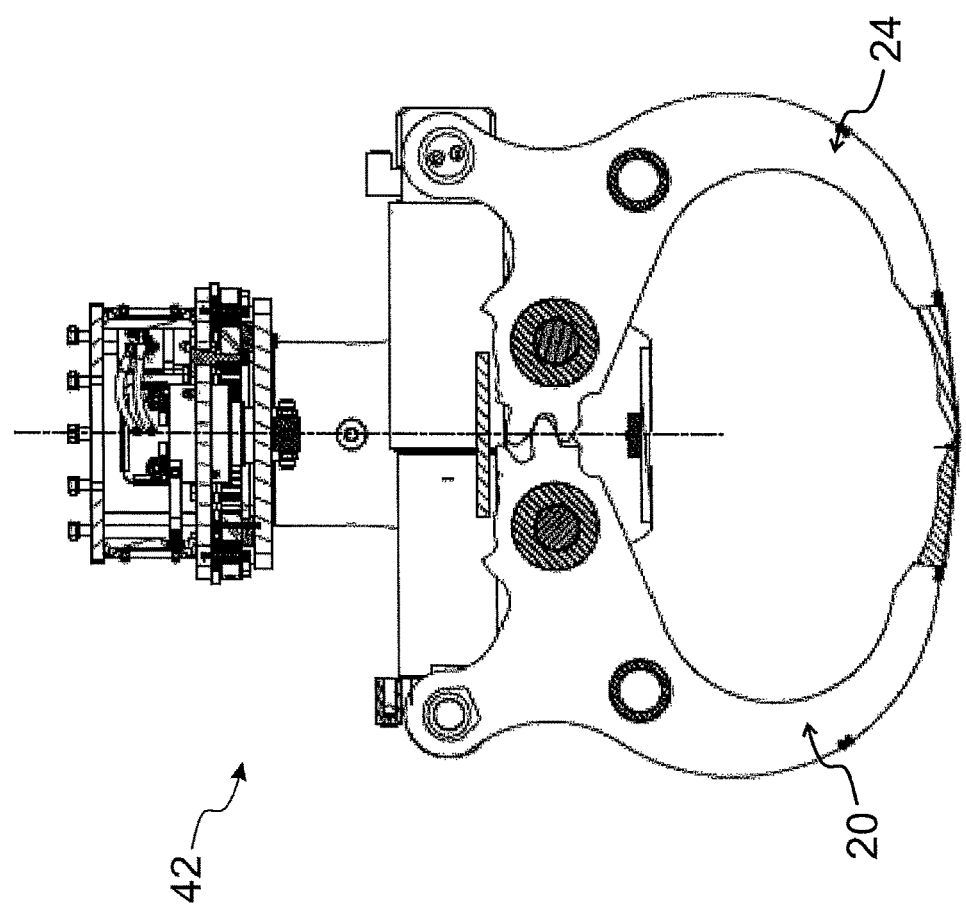
FIG. 4 shows the example of FIG. 1 as a front view, as a section at point A-A, and with the jaws in a fully closed position.
Figure 7:
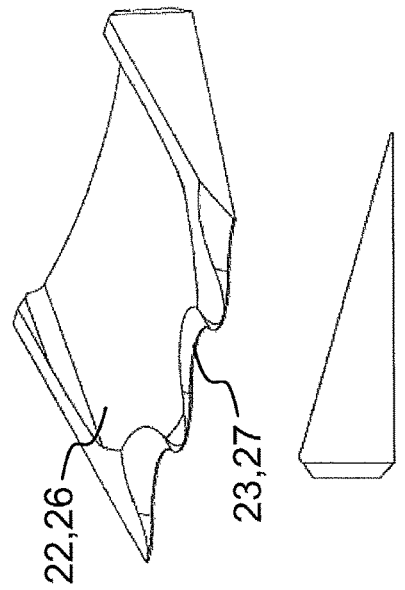
FIGS. 5, 6, 7 and 8 show examples of the cutting blades and their cross-sections.

In the accompanying Figures, the same or corresponding parts are marked with the same reference number.

The stump extraction device 42 according to an alternative and an example of the solution presented, as shown in FIGS. 1 and 2, comprises a body 10, two jaws 20 and 24, two cutting blades 22 and 26, at least one linear actuator 12, a rotation device and fixing elements 18.

The body 10 consists of, for example, sheet structures fixed to each other. The actuator 12 and a part of the structures of the jaws 20, 24 may be located inside the body 10, for example, between the sheet structures of the body 10.

In the position of use according to FIG. 2, where the stump extraction device 42 is essentially vertical, the jaws 20, 24 are positioned under the stump extraction device 42 and move, when opening and closing, mainly in opposite sideways directions. When the jaws 20, 24 are open, the stump extraction device 42 is open downwards, in other words, the space between the jaws 20, 24 and the interior are accessible from below. In the said operating position, the fixing elements 18 are positioned on top of the stump extraction device 42.

The jaws 20, 24 are connected to the body 10 by one common or several separate articulations 32, 34.

According to an example and FIG. 2, each jaw 20, 24 is fixed to the body 10 rotatably by means of its own separate articulation 32, 34. In the operating position according to FIG. 2, the articulations 32, 34 may be located at essentially the same height. The articulations 32, 34 are located at a distance and separately from each other in such a way that the rotation axes of the articulations 32, 34 are essentially parallel and horizontal and at a distance from one another.

According to an example and FIG. 1, each jaw 20, 24 is provided with openings through which soil, sand, gravel and stones can be discharged from between the jaws 20, 24.

According to an example and FIG. 2, access between and inside the jaws 20, 24 from the front and the rear is also possible when the jaws 20, 24 are closed. In other words, the stump extraction device 42 is open to the front and to the back when the jaws 20, 24 are open and closed.

According to an example, each jaw 20, 24 consists of, for example, sheet structures 21 fixed to each other, of which there are at least two, and which are fixed to each other, for example, by means of connective structures 39, 40, 41. The sheet structures 21 are mutually essentially parallel and located at a distance from one another so that openings or slots are formed between the sheet structures 21. According to an example and FIG. 1, each jaw 20, 24 of the stump extraction device comprises five parallel sheet structures 21.

To the jaws 20, 24 is connected at least one linear actuator 12 which turns the jaws 20, 24 with its force into the fully open position shown in FIG. 3, the fully closed position shown in FIG. 4, and into a desired position between these positions, for example, into the open position shown in FIG. 2.

According to one example, the linear actuator 12 is a hydraulic cylinder, to which pressurised hydraulic fluid is conveyed and which generates the force and movement moving the jaws 20. The said hydraulic cylinder is, for example, double-acting. The hydraulic fluid conveyed to the hydraulic cylinder is controlled and managed, for example, by means of one or more control valves and a control circuit. The said control valve or control circuit is located, for example, in the working machine 44 of FIG. 9 or it is a part of the hydraulic system of the working machine 44, to which a linear actuator 12 is connected for control.

According to an example and FIG. 2, the stump extraction device 42 comprises at least one linear actuator 12 which is connected between the jaws 20, 24 by means of articulations 36, 38. The linear actuator 12 may be located in the central part of the stump extraction device 42 and, for example, at least partly inside the body 10 for protection. Each jaw 20, 24 comprises, for example, an upwards rising sheet structure 21, in which the articulation 36, 38 is positioned.

To the free end of each jaw 20, 24 is fixed a cutting blade 22, 26 as an extension of the jaw 20, 24. The cutting blade 22, 26 is most preferably elongated and each cutting blade 22, 26 has a cutting edge 23, 27. In the closed position of the stump extraction device shown in FIG. 4, the cutting edges 23, 27 settle close to one another or against each other. In the operating position according to FIG. 3, the cutting blades 22, 26 are essentially horizontal.

Most preferably, the cutting blade 22, 26 of each jaw 20, 24 is attached to the jaw 20, 24 detachably to allow its replacement.

Each jaw 20, 24 and the cutting blade 22, 26 attached to it form a curved structure essentially resembling a half of an ellipse. The jaw 20, 24 extends sideways away from the body 10 and curves downwards and further in the opposite direction towards the vertical centreline of the stump extraction device 42, which most preferably connects with the rotation axis X1 of the rotation device 14 or is essentially parallel with it.

When in the closed position shown in FIG. 4, the jaws 20, 24 and the cutting blades 22, 26 form an elliptic structure which is flat at the top and bottom. The cutting blades 22, 26 are in an inclined position with respect to the horizontal direction when they are in the open position shown in FIG. 2 or FIG. 3.

According to some examples and FIGS. 5, 6, 7 and 8, the cutting blade 22, 26 may have an at least partly wedge-like cross-section. According to some examples and FIGS. 5, 6, 7 and 8, the cutting edge 23, 27 is straight or shaped, for example, wavy. The shapes of the cutting edges 23, 27 of the opposite cutting blades 22, 26 are fitted to each other in such a way that the cutting edges 23, 27 interlock and at the same time settle close to one another or against one another. According to some examples and FIGS. 5 and 6, the shape of the cutting edge 23, 27 with respect to the centreline of the cutting blade 22, 26 is asymmetrical in such a way that the identical cutting edges 23, 27 of two identical cutting blades 22, 26 interlock and at the same time settle close to and against one another when the cutting edges 23, 27 are opposite one another and the centrelines of the cutting blades 22, 26 are aligned.

Figure 8:
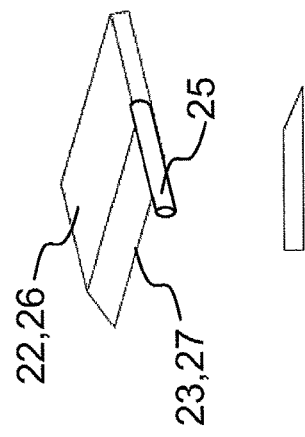
Figure 5:
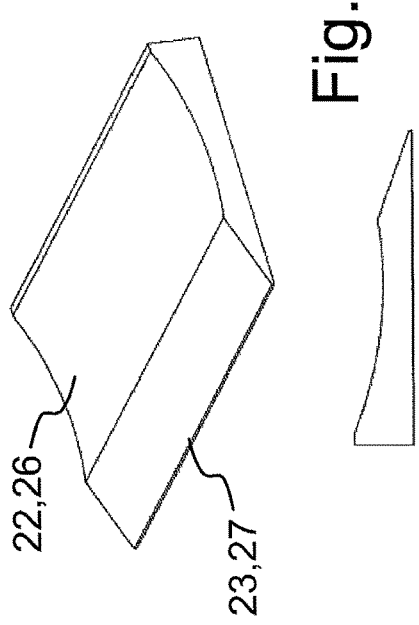
Figure 6:
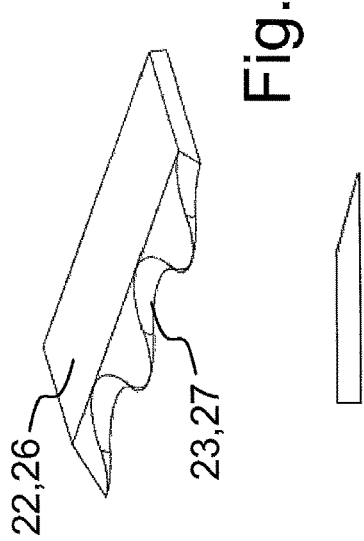

According to one example and FIG. 8, on one side of one or both cutting blades 22, 26 is fixed at least an arm 25 which extends further than the said cutting blade 22, 26 or its cutting edge 23, 27. The arm 25 extends towards the opposite cutting blade 22, 26.

The rotation device 14 is connected to the body 10, most preferably rigidly, and by means of the rotation device 14, the body 10 and at the same time the jaws 20, 24 can be rotated into different rotating positions around the rotation axis X1, for example, from the position of FIG. 1 to the position of FIG. 2. The rotation device 14 is connected, for example, on top of the body 10.

According to an example, the rotation device 14 may comprise at least one actuator 16, most preferably a rotary actuator turns the body 10 with its force.

According to one example, the rotary actuator is a hydraulic motor which generates the force rotating the body 10.

In the operating position according to an example and FIG. 2, the body 10, and at the same time the jaws 20, 24, may be turned around an essentially vertical rotation axis X1.

The fixing elements 18 are connected to the body 10 through the rotation device 14 in such a way that the body 10, and at the same time the jaws 20, 24, may be turned by means of the rotation device 14 into different rotating positions with respect to the fixing elements 18.

According to an example, the fixing elements 18 comprise a structure to which a detachable attachment can be made, for example, with bolts, and in such a way that the stump extraction device 42 may be connected to a desired object, most preferably rigidly. A rigid attachment here means that the fixing elements 18 will not enable the stump extraction device 42 to rotate or turn with respect to the said object.

Figure 9:
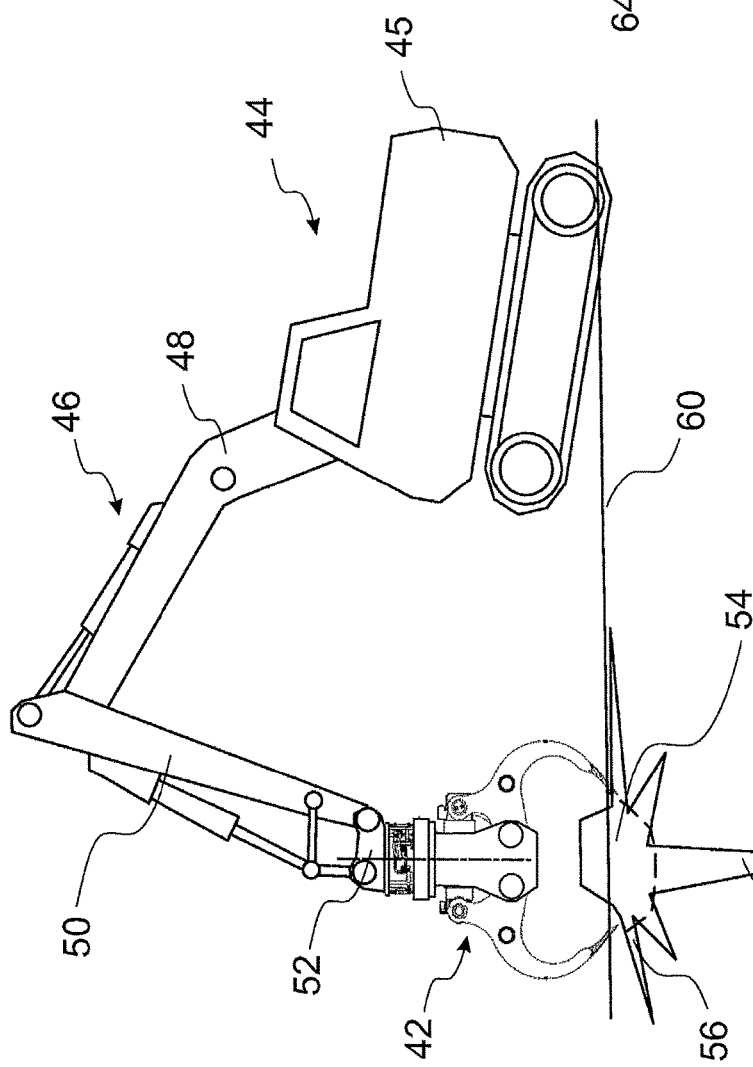
FIG. 9 shows a side view of an example of the stump extraction device according to the solution described, which is connected to the knuckle boom of a moving working machine.

By means of the fixing elements 18, the stump extraction device 42 can be rigidly connected especially to the end of the boom 46 of a working machine 44, as shown in FIG. 9. The position of a rigidly fixed stump extraction device 42 can be controlled by means of the boom 46 most preferably in such a way that the stump extraction device 42 can be lifted and lowered and most preferably also inclined. The stump extraction device 42 is rotated by means of the stump extraction device's 42 own rotation device 14.

The stump extraction device 42 may comprise synchronising elements 30 which synchronise the jaws 20, 24 to move simultaneously in opposite directions, that is, the jaws 20, 24 close and open at the same time and the movement of the jaws 20, 24 is equal.

According to an example and FIG. 2, the synchronising elements 30 are implemented by connecting the jaws 20, 24 mechanically to one another. According to an example and FIG. 2, the jaws 20, 24 comprise gearing which acts as a synchronisation elements 30 and by means of which the rotating jaws 20, 24 are forced into simultaneous operation. According to an example and FIG. 2, the synchronising elements 30 are located between separate articulations 32, 34.

The stump extraction device may comprise one or more splitting blades 28 located on the inside of the jaws 20, 24. According to an example and FIG. 2, the splitting blade 28 is fixed under the body 10, between and inside the jaws 20, 24. According to another example, the splitting blade 28 is fixed to a jaw 20, 24, or to each jaw 20, 24 is fixed at least one splitting blade 28, which is located inside the jaws 20, 24.

According to one alternative to the solution presented and the example of FIG. 9, the stump extraction device 42 is connected to a moving working machine 44. Most preferably, the moving working machine 44 has a knuckle boom 46, to the end of which the stump extraction device 42 is detachably connected. The stump extraction device 42 is fixed to the knuckle boom 46 most preferably rigidly, as disclosed above.

According to an example and FIG. 9, the moving working machine 44 is a crawler excavator which moves independently and is steered by a driver.

According to an example and FIG. 9, the knuckle boom 46 comprises at least a first boom part 48 which is rotatingly fixed to the body part 45 of the working machine 44, and a second boom part 50 which is rotatingly fixed to the end of the first boom part 48. The position of the first and second boom parts 48, 50 may be changed, for example, by means of the forces generated by the linear actuators of the knuckle boom 46.

According to an example, to the end of the second boom part 50 are rotatingly fixed position control elements 52, to which the stump extraction device 42 is connected, most preferably rigidly. The position of the position control elements 52 and at the same time of the stump extraction device 42, can be changed, for example, by means of the force generated by a linear actuator. The said linear actuator may be located in the knuckle boom 46. According to another example, to the end of the second boom part 50 is, most preferably rigidly, connected a position control device, to which the stump extraction device 42 is connected, most preferably rigidly, The position of the position control device and at the same time of the stump extraction device 42, can be changed, for example, by means of the force generated by one or more linear actuators of the position control device.

Most preferably, the position control elements 52 or position control device are configured to hold the stump extraction device 42 in the position shown in FIG. 2 and to incline the stump extraction device 42 in at least a second sideways direction, for example, away from the working machine 44. The position control elements 52 or position control device incline the stump extraction device 42 around an essentially horizontal rotation axis and the said rotation axis is preferably located above the stump extraction device 42.

Between the stump extraction device 42 and the position control elements 52, or the stump extraction device 42 and the position control device, may be quick-clamping elements by means of which the stump extraction device 42 can be rigidly connected to the position control elements 52 or position control device.

According to an alternative to the solution presented and the example of FIG. 9, the stump extraction device 42 is configured to cut stumps 54 off the ground. With the stump extraction device 42, the essentially horizontal roots 56 of the stump 54 and, if necessary, also the essentially vertical root 58, are separated by cutting from the stump 54 and the stump 54 is extracted from the ground. The roots 56, 58 that have been cut off remain in the ground when the stump 54 is extracted. Most preferably, the roots 56, 58 that have been cut off are not extracted from the ground, but are left to decay in the ground.

Figure 10:
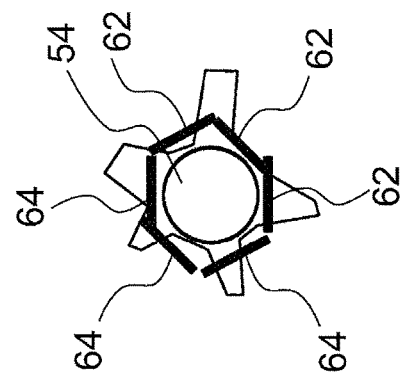
FIG. 10 illustrates the method according to the solution described for extracting a stump and shows a top view of the stump.

According to an example and FIGS. 9 and 10, the roots 56, 58 are cut off the stump 54 by one or more cutting movements. During the said cutting movement, the open jaws 20, 24 are first set on opposite sides of the stump 54 (so-called preliminary stage) and are then moved towards the closed position (so-called cutting stage). The jaws 20, 24 will then close either completely, almost completely or only partly. At the same time, the cutting blades 22, 26 move in a curved movement below the stump 54. The stump 54 settles inside the jaws 20, 24, under the body 10.

The jaws 20, 24 are opened either completely or almost completely between two cutting movements and pulled away from under the stump 54 and from the ground 60.

Between two cutting movements, the stump extraction device 42 can be turned (so-called position changing stage) by means of the rotation device 14 into a different position to allow the cutting movement described above to be repeated. The stump extraction device 42 is then turned around an essentially vertical rotation axis X1. The said rotation axis X1 is essentially perpendicular to the rotation axes of the articulations 32, 34. During the cutting movement, the stump extraction device 42 is essentially in the operating position shown in FIG. 2 and vertical.

According to an example, the stump 54 is cut off with 2 to 4 cutting movements depending on the size of the stump 54 and the size of the cutting blades 22, 26. According to an example and FIG. 10, the stump 54 is cut off with three cutting movements. By line pairs 62, 64 are illustrated the locations in the ground 60 where the cutting blades 22, 26 are set and dig into during the cutting movement. The line pairs 62, 64 at the same time describe the different rotating positions of the stump extraction device 42, as described above. Between the different rotation positions, the stump extraction device 42 is turned by approximately 45°, 60° or 90°.

According to an example, at the end of the first cutting movement, the jaws 20, 24 will not close but remain in the open position. Most preferably, at the end of the final cutting movement, the jaws 20, 24 close and remain in the fully closed position. In this case, during the said final cutting movement, the essentially vertical root 58 is also cut.

According to an example, after the final cutting movement (so-called final stage), the stump extraction device 42 is first inclined to separate the stump 54 from the cut roots 56, 58 and the stump extraction device 42 together with the cut stump 54 are lifted up. According to some examples, the stump extraction device 42 is then inclined by means of the knuckle boom assembly 46 of the working machine 44, the position control elements 52 or the above-mentioned position control device.

According to an example, the penetration of the cutting blades 22, 26 into the ground and roots 56, 58 is further intensified by the mass of the knuckle boom assembly 46, the working machine 44 or both.

The said vertical position of the stump extraction device 42 is then maintained by means of the position control elements 52 or the said position control device, if necessary, also by means of the rotation device 14. The mass of the knuckle boom assembly 46 presses the stump extraction device 42 downwards, which effect can be intensified by pressing knuckle boom assembly 46 downwards, for example, by means of the linear actuator of the knuckle boom assembly 46, that is, by turning the knuckle boom assembly 46 downwards with respect to the body part 45. At the same time, the jaws 20, 24 which are in the open position and set on different sides of the stump 54 for cutting the roots 56, 58, are moved into the closed position.

If necessary, the mass of the working machine 44 is also used to intensify the operation by pressing the stump extraction device 42 downwards with the knuckle boom assembly 46 to such an extent that the working machine 44 inclines and rises partly off, for example, the ground 60. The working machine 44 then rises so as to be supported by the stump extraction device 42 and rests on it. In the said situation, the working machine 44 rests on the ground 60 by means of the knuckle boom assembly 46 and the stump extraction device 42. When the working machine 44 is a crawler excavator, for example, a 2-track excavator, in the situation described above, one track rises off the ground and the other rests on the ground 60. An alternative in the above-mentioned situation is that one end of both tracks rises off the ground and the other end rests on the ground 60.

The solution presented is not limited to what is disclosed in the drawings, the alternatives disclosed above and the examples. The solution presented may be applied within the scope of the accompanying claims.

The invention claimed is:

1. A stump extraction device that is suitable for extracting a stump from the ground, the device comprising:
   a body;
   two opposite jaws that are rotatingly connected to be body by one or more articulations and are movable into an open position and a closed position;
   one or more actuators that are positioned in the body and are configured to move the jaws;
   a rotation device that is fixed rigidly to the body and that is configured to rotate the body together with the jaws into different positions about a vertical rotation axis in an operating position of the stump extraction device;
   synchronizing elements that are configured to synchronize movement of the jaws in such a way that the jaws move simultaneously and in opposite directions;
   two opposite cutting blades that are configured to cut off roots in the ground from the stump in the ground, the cutting blades being extensions of free ends of the jaws and having cutting edges that settle against or close to each other in the closed position of the jaws; and
   fixing elements that are fixed to the rotation device and that are configured to rigidly fix the stump extraction device to a desired object such that the rotation device rotates the body and the jaws with respect to the fixing elements.

2. The stump extraction device as claimed in claim 1, further comprising at least one splitting blade, which is fixed under the body and located between and inside the jaws.

3. The stump extraction device as claimed in claim 1, further comprising at least one splitting blade, which is located inside the jaws and fixed to the body or to one of the jaws.

4. The stump extraction device as claimed in claim 1, wherein an arm is fixed on one side of at least one cutting blade, the arm extending towards the opposite cutting blade and further than the cutting edge.

5. The stump extraction device as claimed in claim 1, wherein the jaws are configured to reciprocate in two opposite sideways directions and open in forward and backward directions.

6. The stump extraction device as claimed in claim 1, wherein the jaws are provided with openings through which soil, sand, gravel and stones can be discharged from between the jaws.

7. The stump extraction device as claimed in claim 1, wherein each edge of the cutting edges is straight or wavy.

8. The stump extraction device as claimed in claim 1, wherein, in the operating position, the cutting blades are adapted to move in a curved movement below the stump in the ground such that in the closed position the stump settles inside the jaws under the body.

9. The stump extraction device as claimed in claim 1, wherein the fixing elements are adapted to rigidly connect the rotation device to an end of a knuckle boom of a working machine or to position control elements or a position control device connected rigidly to the end of the knuckle boom.

10. A moving working machine comprising:
  a stump extraction device that is suitable for extracting a stump from the ground;
  a knuckle boom assembly; and
  position control elements or a position control device that connect the stump extraction device to an end of the knuckle boom assembly, and to which the stump extraction device is rigidly connected, the position control elements or the position control device being configured to incline the stump extraction device into different positions;
  wherein the stump extraction device comprises:
    a body;
    two opposite jaws that are rotatingly connected to the body by one or more articulations and are movable into an open position and a closed position;
    one or more actuators that are positioned in the body and are configured to move the jaws;
    a rotation device that is fixed rigidly to the body and that is configured to rotate the body together with the jaws into different positions about a vertical rotating axis in an operating position of the stump extraction device;
    synchronizing elements that are configured to synchronize movement of the jaws in such a way that the jaws move simultaneously and in opposite directions;
    two opposite cutting blades that are configured to cut off roots in the ground from the stump in the ground, the cutting blades being extensions of free ends of the jaws and having cutting edges that settle against or close to each other in the closed position of the jaws; and
    fixing elements that are fixed to the rotation device and that are configured to rigidly fix the stump extraction device to the position control elements or the position control device such that the rotation device rotates the body and the jaws with respect to the fixing elements.

11. The moving working machine as claimed in claim 10, wherein the moving working machine is a crawler excavator.

12. The moving working machine as claimed in claim 10, wherein the knuckle boom assembly comprises a first boom part, which is rotatingly fixed to a body part of the working machine, and a second boom part, which is rotatingly fixed to an end of the first boom part, and wherein the position of the first boom part and the second boom part can be changed by means of forces generated by linear actuators of the knuckle boom assembly.

13. The working machine as claimed in claim 12, wherein, in the operating position, the cutting blades are adapted to move in a curved movement below the stump in the ground such that in the closed position the stump settles inside the jaws under the body.

14. A method for extracting a stump from the ground by utilizing a system that comprises a moving working machine and a stump extraction device,
  the working machine comprising:
    a knuckle boom assembly; and
    position control elements or a position control device that connect the stump extraction device to an end of the knuckle boom assembly, and to which the stump extraction device is rigidly connected, the position control elements or the position control device being configured to incline stump extraction device into different positions; and
  the stump extraction device comprising:
    a body;
    two opposite jaws that are rotatingly connected to the body by one or more articulations and are movable into an open position and a closed position;
    synchronizing elements that are configured to synchronize movement of the jaws in such a way that the jaws move simultaneously and in opposite directions;
    two opposite cutting blades that are extensions of free ends of the jaws and that have cutting edges that settle against or close to each other in the closed position of the jaws;
    one or more actuators that are positioned in the body and are configured to move the jaws;
    a rotation device that is fixed rigidly to the body and that is configured to rotate the body together with the jaws into different positions about a vertical rotation axis in an operating position of the stump extraction device;
    fixing elements that are fixed to the rotation device and that are configured to rigidly fix the stump extraction device to the position control elements or the position control device such that the rotation device rotates the body and the jaws with respect to the fixing elements; and
  the method comprising:
    at a preliminary stage, placing the cutting blades on opposite sides of the stump in the ground by means of the knuckle boom assembly, when the jaws are in the open position;
    at a cutting stage, cutting off roots in the ground from the stump in the ground by means of the cutting blades that penetrate into the ground by bringing the jaws towards the closed position and the underside of the stump in the ground; and
    at a final stage, separating the stump from the roots by bringing the jaws into the closed position and extracting the stump from the ground by raising the stump extraction device by means of the knuckle boom assembly.

15. The method as claimed in claim 14, further comprising:
after the cutting stage, carrying out at least one position changing stage at which the jaws are brought towards the open position and the jaws are lifted from the ground and the stump extraction device is rotated by means of the rotation device around a vertical rotation axis, and
repeating the preliminary stage and the cutting stage.

16. The method as claimed in claim 14, further comprising:
during the cutting stage, pressing the stump extraction device to the ground by means of the knuckle boom assembly or by supporting the working machine on the ground by means of the knuckle boom assembly and the stump extraction device, so that the working machine inclines and rises partially off the ground.

17. The method as claimed in claim 15, further comprising:
during the cutting stage, pressing the stump extraction device to the ground by means of the knuckle boom assembly or by supporting the working machine on the ground by means of the knuckle boom assembly and the stump extraction device, so that the working machine inclines and rises partially off the ground.

18. The method as claimed in claim 14, wherein during the final stage, the roots are left in the ground.

19. The method as claimed in claim 14, wherein the working machine is a crawler excavator.

20. The method as claimed in claim 14, wherein, in the operating position, the cutting blades are adapted to move in a curved movement below the stump in the ground such that in the closed position the stump settles inside the jaws under the body.

* * * * *